(12) United States Patent
Gibson et al.

(10) Patent No.: US 9,858,068 B2
(45) Date of Patent: Jan. 2, 2018

(54) METHODS AND SYSTEMS FOR PLANNING APPLICATION DEPLOYMENT

(75) Inventors: Jonathan David Gibson, Austin, TX (US); Matthew A. Stuempfle, Raleigh, NC (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 129 days.

(21) Appl. No.: 13/806,031

(22) PCT Filed: Jun. 22, 2010

(86) PCT No.: PCT/US2010/039432
§ 371 (c)(1),
(2), (4) Date: Dec. 20, 2012

(87) PCT Pub. No.: WO2011/162744
PCT Pub. Date: Dec. 29, 2011

(65) Prior Publication Data
US 2013/0097597 A1 Apr. 18, 2013

(51) Int. Cl.
*G06F 9/445* (2006.01)
*G06F 9/455* (2006.01)
*G06F 9/50* (2006.01)

(52) U.S. Cl.
CPC ............ *G06F 8/67* (2013.01); *G06F 9/45533* (2013.01); *G06F 8/61* (2013.01); *G06F 9/5044* (2013.01);

(Continued)

(58) Field of Classification Search
CPC .. G06F 9/45537; G06F 9/44505; G06F 9/465; G06F 17/50; G06F 8/71;
(Continued)

(56) References Cited

U.S. PATENT DOCUMENTS 7,200,530 B2 * 4/2007 Brown et al. ............... 703/1
7,506,037 B1 3/2009 Ciano et al.
(Continued)

FOREIGN PATENT DOCUMENTS

CN 1601510 A 3/2005
CN 1836208 9/2006
(Continued)

OTHER PUBLICATIONS

International Search Report and Written Opinion for PCT/US2012/039432, Korean Intellectual Property Office, Apr. 1, 2011.
(Continued)

*Primary Examiner* — Tuan Vu
(74) *Attorney, Agent, or Firm* — Hewlett Packard Enterprise Patent Department

(57) ABSTRACT

According to one example, there is provided a method of deploying applications in a computer system. The method comprises obtaining, for each of a plurality of computer applications, a set of application characteristics, assigning, based on the obtained characteristics, each of the plurality of applications to one of a set of predetermined application models, and determining, based in part on the obtained characteristics and in part on application model compatibility data, a set of hardware characteristics, a virtual server distribution plan, and an application distribution plan.

18 Claims, 5 Drawing Sheets

(52) U.S. Cl.
CPC .... *G06F 9/5077* (2013.01); *G06F 2009/4557* (2013.01); *G06F 2009/45595* (2013.01)

(58) Field of Classification Search
CPC ...... G06F 2009/4557; G06F 8/61; G06F 8/67; G06Q 10/06; G06Q 10/10
USPC ........ 717/109, 174; 709/221–226, 203, 216; 710/104; 707/100; 703/1
See application file for complete search history.

(56) References Cited

U.S. PATENT DOCUMENTS

| | | |
|---|---|---|
| 7,774,463 B2 | 8/2010 | Bloching et al. |
| 8,024,396 B2 | 9/2011 | Sedukhin et al. |
| 8,151,256 B2 | 4/2012 | Ramannavar et al. |
| 8,175,863 B1 | 5/2012 | Ostermeyer et al. |
| 8,181,186 B1* | 5/2012 | Holcomb et al. ............. 719/310 |
| 8,225,308 B2 | 7/2012 | Sedukhin et al. |
| 8,261,266 B2 | 9/2012 | Pike et al. |
| 8,387,048 B1 | 2/2013 | Grechishkin et al. |
| 8,407,417 B2 | 3/2013 | Matsuda et al. |
| 8,595,737 B2 | 11/2013 | Ichikawa et al. |
| 8,683,548 B1 | 3/2014 | Curry et al. |
| 8,825,964 B1 | 9/2014 | Sopka et al. |
| 2002/0091702 A1* | 7/2002 | Mullins ........................ 707/100 |
| 2003/0110236 A1 | 6/2003 | Yang et al. |
| 2003/0120780 A1 | 6/2003 | Zhu et al. |
| 2003/0233431 A1* | 12/2003 | Reddy et al. .................. 709/221 |
| 2004/0073673 A1 | 4/2004 | Santos et al. |
| 2005/0021530 A1 | 1/2005 | Garg et al. |
| 2005/0091227 A1 | 4/2005 | McCollum et al. |
| 2005/0154788 A1 | 7/2005 | Yang et al. |
| 2005/0204354 A1* | 9/2005 | Sundararajan et al. ...... 717/174 |
| 2005/0283759 A1 | 12/2005 | Peteanu et al. |
| 2006/0080413 A1 | 4/2006 | Oprea et al. |
| 2006/0106585 A1* | 5/2006 | Brown et al. ..................... 703/1 |
| 2007/0006218 A1 | 1/2007 | Vinberg et al. |
| 2007/0028239 A1 | 2/2007 | Dyck et al. |
| 2008/0104605 A1 | 5/2008 | Steinder et al. |
| 2008/0235378 A1 | 9/2008 | Fried et al. |
| 2008/0294777 A1* | 11/2008 | Karve et al. .................. 709/226 |
| 2008/0320269 A1 | 12/2008 | Houlihan et al. |
| 2009/0012981 A1 | 1/2009 | Kogoh |
| 2009/0070760 A1 | 3/2009 | Khatri et al. |
| 2009/0070771 A1 | 3/2009 | Yuyitung et al. |
| 2009/0106409 A1 | 4/2009 | Murata |
| 2009/0112966 A1 | 4/2009 | Pogrebinsky et al. |
| 2009/0150529 A1 | 6/2009 | Tripathi |
| 2009/0172666 A1 | 7/2009 | Yahalom et al. |
| 2009/0204961 A1 | 8/2009 | Dehaan et al. |
| 2009/0222560 A1 | 9/2009 | Gopisetty et al. |
| 2009/0228589 A1 | 9/2009 | Korupolu |
| 2010/0005173 A1 | 1/2010 | Baskaran et al. |
| 2010/0030893 A1 | 2/2010 | Berg et al. |
| 2010/0031247 A1 | 2/2010 | Arnold et al. |
| 2010/0250744 A1 | 9/2010 | Hadad et al. |
| 2010/0262974 A1 | 10/2010 | Uyeda |
| 2010/0274981 A1 | 10/2010 | Ichikawa |
| 2010/0281482 A1 | 11/2010 | Pike et al. |
| 2010/0306735 A1* | 12/2010 | Hoff et al. .................... 717/109 |
| 2010/0332657 A1 | 12/2010 | Elyashev |
| 2010/0332661 A1 | 12/2010 | Tameshige |
| 2010/0333089 A1 | 12/2010 | Talwar et al. |
| 2011/0099548 A1 | 4/2011 | Shen et al. |
| 2011/0131569 A1 | 6/2011 | Heim |
| 2011/0145782 A1* | 6/2011 | Brukner et al. .............. 717/104 |
| 2011/0202640 A1 | 8/2011 | Pillutla |
| 2011/0209146 A1 | 8/2011 | Box et al. |
| 2011/0225277 A1 | 9/2011 | Freimuth et al. |
| 2011/0231839 A1 | 9/2011 | Bennett et al. |
| 2011/0246739 A1 | 10/2011 | Matsuda et al. |
| 2011/0282982 A1 | 11/2011 | Jain |
| 2012/0042311 A1 | 2/2012 | Biran et al. |
| 2012/0192181 A1 | 7/2012 | Gilbert et al. |
| 2012/0266166 A1 | 10/2012 | Farkas et al. |
| 2012/0311603 A1 | 12/2012 | Kudo et al. |
| 2013/0097293 A1 | 4/2013 | Gibson et al. |
| 2013/0097597 A1 | 4/2013 | Gibson et al. |
| 2013/0238804 A1 | 9/2013 | Tanino et al. |
| 2013/0339956 A1 | 12/2013 | Murase et al. |
| 2013/0346973 A1 | 12/2013 | Oda et al. |
| 2014/0223428 A1 | 8/2014 | Hackett et al. |

FOREIGN PATENT DOCUMENTS

| | | |
|---|---|---|
| CN | 101937357 A | 1/2011 |
| JP | 2009116852 A | 5/2009 |
| JP | 2011008481 A | 1/2011 |

OTHER PUBLICATIONS

"Managing VMware Doesn't End with Managing VMware", netiQ, Apr. 2008. <http://download.netiq.com/CMS/WHITEPAPER/ManagingVMware.pdf>.

Bailey, Michelle, "The Economics of Virtualization" Moving Toward an Application-Based Cost Model, Nov. 2009.

Extended European Search Report ~ Application No. 10853787.9-1954 dated Aug. 11, 2014 ~ 8 pages.

Tickoo, Omesh et al., "Modeling Virtual Machine Performance: Challenges and Approaches", Intel Labs, Intel Corporation, vol. 37; pp. 55-60, 2010.

Extended European Search Report, EP Application No, 10853789.5, Dated Jun. 18, 2014, pp. 1-6, EPO.

Extended European Search Report, EP Application No. 11863212.4, Dated Feb. 16, 2016, pp. 1-7, EPO.

International Search Report and Written Opinion, International Application No. PCT/US2010/039438, Dated Mar. 24, 2011, pp. 1-7, KIPO.

International Search Report and Written Opinion, International Application No. PCT/US2011/031523, Dated Dec. 23, 2011, pp. 1-6. KIPO.

* cited by examiner

METHODS AND SYSTEMS FOR PLANNING APPLICATION DEPLOYMENT

CLAIM FOR PRIORITY

The present application is a national stage filing under 35 U.S.C 371 of PCT application number PCT/US2010/039432, having an international filing date of Jun. 22, 2010, the disclosure of which is hereby incorporated by reference in its entirety.

BACKGROUND

Many modern businesses and organizations rely heavily on information technology (IT) to provide computer-based tools and services to enable them and their customers to operate efficiently. The tools and services are typically provided by a multitude of different software applications which typically run on a variety of computing hardware, such as computer servers, networking equipment, storage devices, and the like. For reasons of efficiency and ease of management, this computing hardware is increasingly being consolidated in specialized data centers.

Software applications may be conveniently arranged to run in a virtualized environment through use of software virtualization applications, such as virtual machines. In this way, a single computer server may effectively concurrently run multiple computer operating systems instances (or virtual images) and concurrently run different applications on each of the virtual images.

When deciding on what computing hardware to provision in a data center often little regard is given to the nature of the software applications that are to be run. Accordingly, poorly planned data centers may be provisioned with much more computing hardware than is actually required to run a set of software applications. Not only is such over provisioning costly, it may also lead to the software applications being deployed on the computing hardware in an inefficient manner. Inefficient deployment may lead to so-called server or virtual sprawl, the consequences of which may include significant increases in power, cooling, and space requirements.

BRIEF DESCRIPTION

Examples of the invention will now be described, by way of non-limiting example only, with reference to the accompanying drawings, in which.

DETAILED DESCRIPTION

Various embodiments will be described below with reference to various examples.

Figure 1:
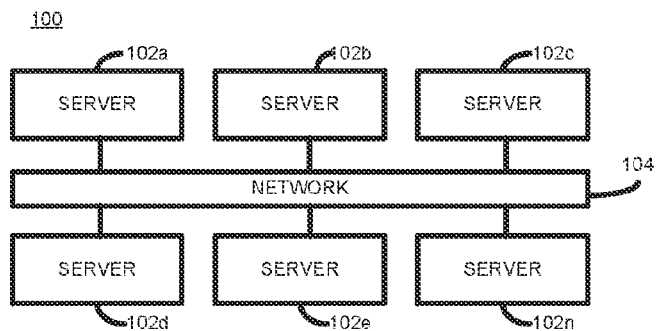
FIG. 1 is a simplified block diagram illustrating a portion of a data center.

Increasingly, enterprise software applications are being deployed in virtualized environments on powerful computing hardware provisioned in specialized facilities such as data centers. FIG. 1 shows a simplified block diagram illustrating a portion of a data center 100. The data center 100 comprises a number of computer servers 102a to 102n connected to a data center backbone network 104. Those skilled in the art will appreciate that, for clarity, not all elements of a typical data center are shown.

Each of the servers 102a to 102n runs a virtualization application, such as VMWare, Inc. vSphere application, which enables instances, or virtual images, of different operating systems to concurrently execute on each of the servers. For example, server 102a may execute a virtualization application that enables the concurrent execution of instances of a Microsoft, Linux, and Solaris operating system, and further enables the concurrently execution of different applications on each of the different operating systems instances.

Figure 2:
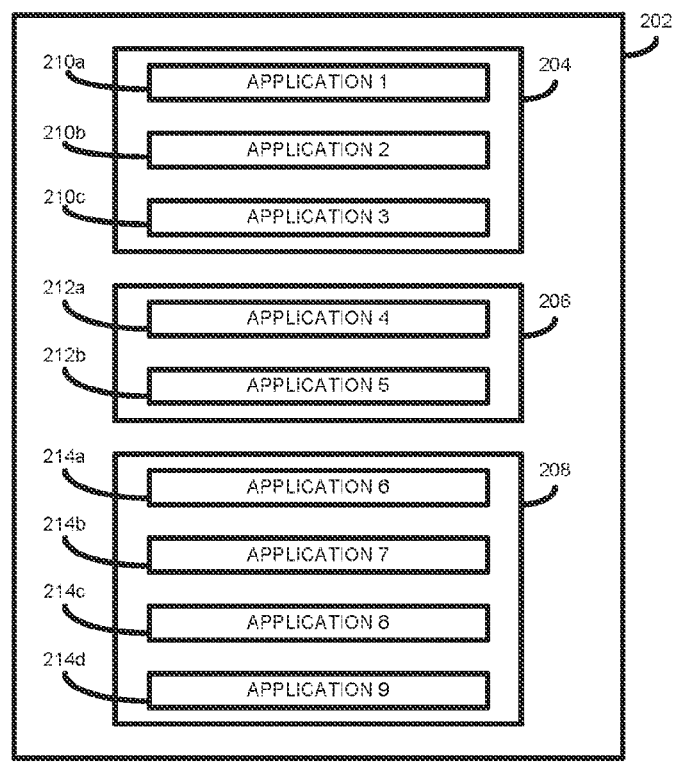
FIG. 2 is a simplified illustration of an example deployment of operating systems and software applications in a computer server.

As shown in FIG. 2, a virtualization application 202 executes and manages the virtualized execution of three different operating system instances 204, 206, and 208. On the first operating system instance 204 are executed applications 210a, 210b, and 210c. On the second operating system instance 206 are executed applications 212a and 212b. On the third operating system instance 208 are executed applications 214a to 214d.

Currently, system architects wishing to deploy a set of applications have typically identified a set of unused computing hardware, for example in a data center, and have determined how the set of applications would be deployed on the computing hardware based largely on their personal knowledge and experience. However, it is common for system architects to substantially over-specify hardware requirements to avoid the risk of potential server overload. Furthermore, it is common for system architects to deploy the applications on the hardware in a somewhat cautious manner by only lightly loading each server with applications to avoid the risk of server overload. However, such an approach may lead to so-called virtualization or server sprawl in which a large number of physical servers run at low utilization. This can lead to significant inefficiencies with respect to data center power, cooling systems, memory, storage, and physical space.

Figure 3:
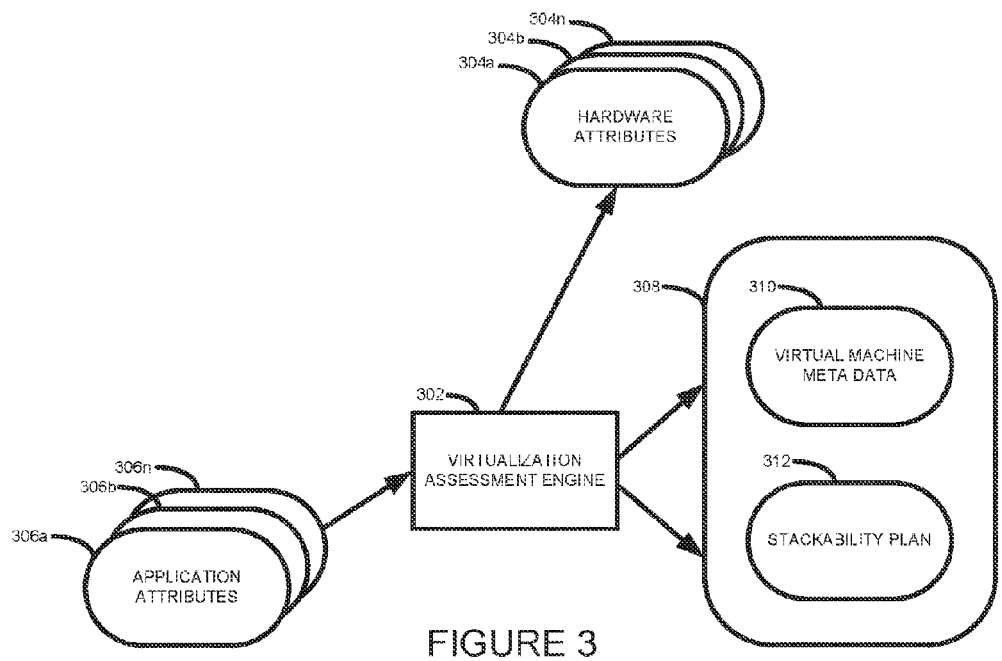
FIG. 3 is a simplified block diagram illustrating a virtualization assessment engine 302 according to an example of the present invention.
Figure 4:
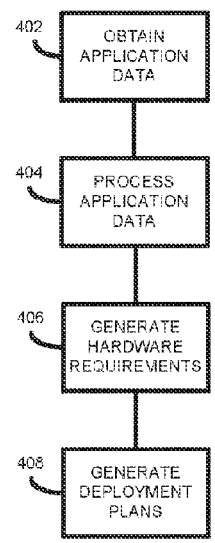
FIG. 4 is a simplified flow diagram outlining a method of operating a virtualization assessment engine according to an example of the present invention.
Figure 6:
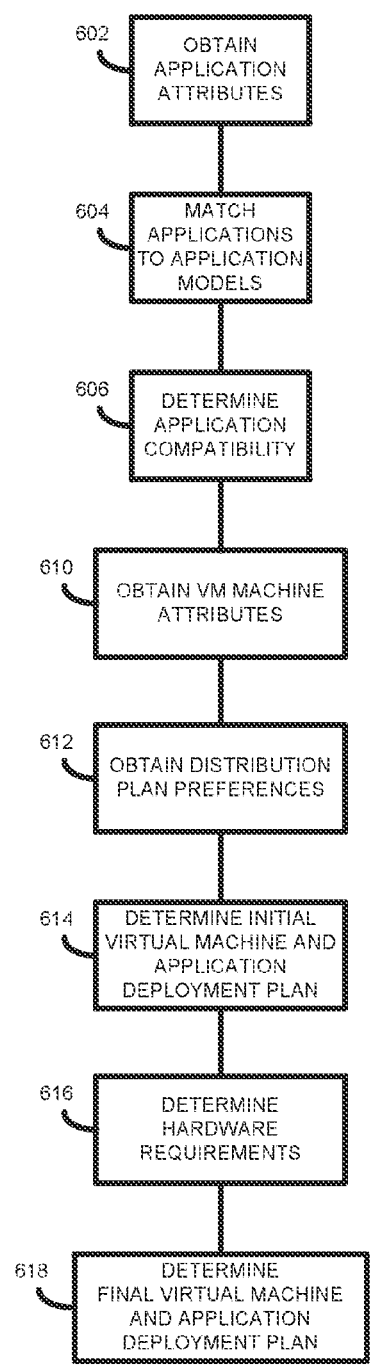
FIG. 6 is a simplified flow diagram outlining a method of operating a virtualization assessment engine according to an example of the present invention.

Referring now to FIG. 3, there is shown a virtualization assessment engine 302 according to an example of the present invention. Methods of operating the virtualization assessment engine 302 according to various examples are described below with further reference to the flow diagrams of FIG. 4 and FIG. 6.

In accordance with one or more examples, the virtualization assessment engine 302 determines or generates the characteristics of a set of computing hardware that may be used to execute the set of target applications, and additionally determines an efficient manner of distributing or deploying the set of target applications of the determined hardware.

In one example, the virtualization assessment engine 302 obtains (402) data 306a to 306n relating to a set of target applications that are desired to be run in a data center or other computing facility. The virtualization assessment engine 302 processes (404) the obtained data and generates (406) the characteristics of a set of hardware requirements 304a to 304n that may be used to execute the target applications. The virtualization assessment engine 302 then generates (408) a deployment plan 308 for appropriately distributing those applications on the determined hardware. The deployment plan 308 comprises a plan 310 for distributing operating system virtual images across the determined set computing hardware and a plan 312 for distributing, deploying, or stacking, the target applications between the different operating system virtual instances.

The data 306 relating to the set of applications may, for example, be obtained automatically through use of software agents, software management tools, manually, or in any other appropriate manner. The data 306 may include technical characteristics or requirements, including, for example, the operating system on which the application is designed to run, the amount of memory required, the amount of storage required, etc. The data 306 may additionally comprise business requirements data. The business requirements data may, for example, define business-imposed restrictions or requirements. The business requirements may, for example, be obtained by a data center or system administrator or architect, or in any other appropriate manner.

Complex interactions may exist between different software applications. For example, one software application may, for business or security reasons, be the only application allowed to run on a particular physical computer server to ensure that business imposed security requirements are met. Furthermore, such an application may be required to be installed on a stand-alone virtualization application. By way of further example, an application may be dependent on a specific operating system binary library, may require application component level clustering with physical hardware divergence (for example where physical hardware servers are required to be in separate data center enclosures) for redundancy, and so on.

Making sense of all of the different parameters and factors is a particularly challenging and complex task.

Figure 5:
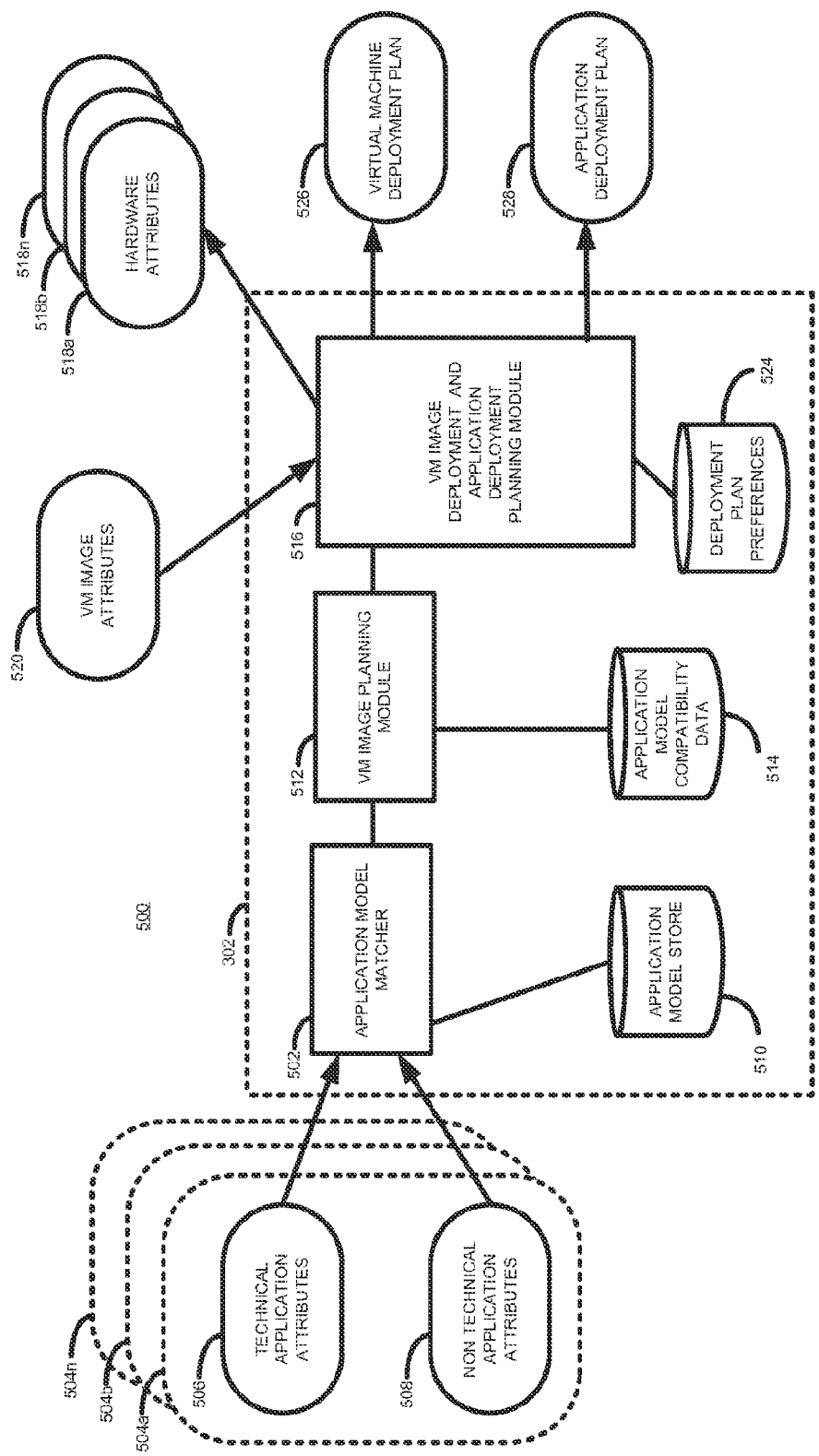
FIG. 5 is a simplified block diagram illustrating a virtualization assessment engine according to an example of the present invention.

Referring now to FIG. 5, there is shown a system 500 in which the virtualization assessment engine 302 is shown in greater detail, according to an example. Further reference is made to FIG. 6.

An application model matcher module 502 obtains (602) a set 504a to 504n of application attributes of a set of target applications which it is desired to install and execute in a virtualized manner. In the present example, the application attributes include both technical 506 and non-technical 508 application attributes. In other examples, the application attributes 504a to 504n may include attributes other than both technical and non-technical attributes.

The non-technical attributes may include, for example, functional requirements that may impact the placement or cohabitation of an application in a virtual environment or on physical hardware. For example, the non-technical attributes may define, from a functional or business aspect, whether an application is allowed to cohabit with other applications in the same virtual machine, or even on the same physical hardware. This may be the case, for example, for an application that has security requirements in which the application owner does not wish for the application to share physical or virtual resources with any other application.

In some examples the set of obtained attributes 504a to 504n include attribute prioritizations or weightings. In other examples, weightings may be allocated once the attributes have been obtained, either manually by a user or automatically by applying predetermined weightings. The weightings may, for example, be used to indicate relative importance of different characteristics.

Example application attributes are shown below in Tables 1 and 2.

TABLE 1

Example application attributes
Application 1

| | |
|---|---|
| Technical attributes | Operating System: Windows 2003 32 bit |
| | Minimum memory required: 1 GB |
| | Average memory utilization: 3.5 GB |
| | Average CPU utilization: 30% |
| | Minimum storage required: 500 GB |
| | No. of IP addresses required: 1 |
| | No. of ports required: 10 |
| | Redundancy level: High |
| Non-technical attributes | PCI Security Requirements: Yes |
| | Availability: High |
| | Web Server tier with load balancing: Yes |
| | Application tier with load balancing: Yes |
| | Application tier with component clustering: Yes |
| | Data tier with clustering: Yes |
| | Data tier with replication: Yes |
| | SLA: 99.9% |

TABLE 2

Example application attributes
Application 2

| | |
|---|---|
| Technical attributes | Operating System: Linux |
| | Minimum memory required: 2 GB |
| | Average memory utilization: 4 GB |
| | Average CPU utilization: 60% |
| | Minimum storage required: 2 TB |
| | No. of IP addresses required: 1 |
| | No. of ports required: 10 |
| | Redundancy level: Low |
| Non-technical attributes | PCI Security Requirements: No |
| | Availability: Low |
| | Web Server tier with load balancing: No |
| | Application tier with load balancing: No |
| | Application tier with component clustering: No |
| | Data tier with clustering: No |
| | Data tier with replication: No |
| | SLA: 98% |

In some examples the application attributes may be defined using a markup language such as the extensible markup language (XML).

The system 500 comprises an application model store 510 in which is stored a set of predetermined application models.

Each application model may be defined through analysis of different software applications that may be desired to be run in a data center. Such analysis may suitably be performed manually by a system administrator or architect or automatically by an application analysis module or tool (not shown). Each application model aims to provide a unique, or substantially unique, set of technical and/or non-technical attributes that identify key application characteristics. Some application models may have only technical attributes, whereas other application models may have both technical and non-technical attributes.

Example application models are shown below in Tables 3 and 4.

TABLE 3

Example application model
Application Mode A

| | |
|---|---|
| Technical attributes | Operating System: Linux |
| | Minimum memory required: 2 GB |
| | Average memory utilization: 4 GB |
| | Average CPU utilization: 30% |
| | Minimum storage required: 500 GB |
| | No. of IP addresses required: 1 |
| | No. of ports required: 10 |
| | Redundancy level: Low |
| Non-technical attributes | PCI Security Requirements: No |
| | Availability: Low |
| | Web Server tier with load balancing: No |
| | Application tier with load balancing: No |

TABLE 4

Example application model
Application Model B

| | |
|---|---|
| Technical attributes | Operating System: Microsoft Windows Window 2008 64 bit |
| | Minimum memory required: 2 GB |
| | Average memory utilization: 4 GB |
| | Average CPU utilization: 60% |
| | Minimum storage required: 1 TB |
| | No. of IP addresses required: 1 |
| | No. of ports required: 10 |
| | Redundancy level: High |
| Non-technical attributes | PCI Security Requirements: Yes |
| | Availability: High |
| | Web Server tier with load balancing: Yes |
| | Application tier with load balancing: Yes |

In some examples the applications models may be defined using a mark-up language such as XML. Example application attributes are shown below in Tables 1 and 2.

At 604 the application model matcher 502 attempts to match or to assign each of the target applications for which application attributes 504 are obtained to an application model stored in the application model store 510.

In one example the matching or assignment process may be performed by searching for an application model that exactly matches each of the obtained application attributes 504 for a given application. In other examples, the matching process may, for example, be performed by searching for an application model that best matches, or substantially matches, the obtained application attributes, or matches with a predetermined degree of similarity at least some of the attributes. For example, some or all of the application attributes may have associated weightings defining a relative importance level or acceptable similarity level. The analysis process may use suitable XML parsing techniques in some examples, where appropriate.

Once each of the application attributes for each target application have been matched or assigned to an application model the results are passed to a virtual machine image planning module 512.

The virtual machine image planning module 512 obtains application model compatibility data stored in an application model compatibility data store 514. In some examples the application model compatibility data may be stored together with the application model data.

The application model compatibility data defines which application models are compatible with which other application models in a virtualized environment and, by inference, defines which application models are incompatible with which other application models. An example is shown in Table 5 below.

TABLE 5

Example application model compatibility

| Application Model | Compatible with models: |
|---|---|
| Application Model A | B, D |
| Application Model B | A, D |
| Application Model C | E, F, G |
| Application Model D | A, B |

Compatibility of one application model with another may be determined by analysis of the technical and non-technical application attributes. The analysis may be performed, for example, manually by a system administrator or system architect, through use of application analysis tools, process monitors, or in any suitable manner. Example application attributes are shown below in Tables 1 and 2.

For instance, an application model requiring a Linux operating system may be determined to be incompatible with an application requiring a Windows operating system. Similarly, an application model in which application component clustering is required may be determined to be incompatible with an application model in which application clustering is not required.

The virtual machine image planning module 512 determines (606), using the application model compatibility data, which applications are compatible with each other and thus which applications may cohabit with which other applications in a given virtual machine image or on the same physical hardware. Applications for which their corresponding application models may be determined as being non-compatible are determined as not being able to cohabit with each other. For example, applications requiring the Linux system may be determined as not being able to cohabit in a virtual machine image of the Windows operating system. By way of further example, applications having attributes defining that server sharing is not allowed would not be allowed to cohabit with other applications, even with applications requiring the same operating system.

The virtual image planning module 512 determines the minimum number of virtual machine instances of each operating system necessary to execute the set of target applications, taking into account the application compatibility data, and details which applications should and should not be collocated in the same operating system instance. The virtual image planning module 512 also determines appropriate configuration parameters for each virtual image. However, this initial determination is made without any regard to required hardware resources. As described below, a greater number of virtual machine images may be required depending on the determined hardware characteristics.

The determined details are passed to a virtual machine image deployment and application deployment planning module 516.

One particular advantage of having a set of application models and predetermined compatibility between those models is that it reduces the task of determining whether different applications are compatible with each other to the relatively straightforward operation of pattern matching key characteristics of a target application to characteristics of a set of application models.

In order to determine an efficient deployment plan a vast number of factors relating to the software applications to be executed, the operating systems required, the virtual images, the virtualization applications, and the physical hardware may need to be taken into consideration. The factors may include both technical or physical factors as well as business factors.

Hardware technical factors may for example, include: processing power; multitasking capabilities; memory capacity; storage capacity; and network bandwidth. Software application technical factors may include, for example: memory requirements; networking requirements; storage requirements; security requirements; redundancy requirements; and processing power requirements.

The virtual machine deployment and application deployment planning module 516 obtains (610) virtual machine image attributes 520 which define attributes of available target virtual machine images. The virtual machine image attributes 520 may include details of minimum hardware resources required, number of execution threads possible, and other appropriate characteristics. The virtual machine attributes 520 may be obtained, for example, by a system administrator or system architect, through data supplied by virtual machine developers or suppliers, through software monitoring applications, software agents, or in any other suitable manner.

The virtual machine deployment and application deployment planning module 516 obtains (612) deployment plan preference data stored in a deployment plan preference data store 524. The deployment plan preference data may be set by a system administrator or system architect, or a default predetermined set of deployment plan preferences may be defined. The deployment plan preferences determine preferences that are to be taken into account by the module 516, as described further below.

The preferences may include hardware preferences, such as preferred processing characteristics, preferred hardware manufacturers, cost ranges, server type, and the like. The preferences may also define specific limitations or thresholds for the use of hardware by the virtual images. In one example the preferences may define a maximum amount of CPU utilization for a hardware device. Use of the plan preferences enables a final deployment or stacking plan to be tailored to specific system administrator or system architects requirements.

The deployment plan preferences are taken into account, along with the VM image attributes (520), so that the VM image deployment and application deployment planning module (516) produces a set of hardware characteristics 518, a virtual machine deployment plan (526) and an application deployment or stackability plan (528).

At 614, the module 516 determines an initial virtual machine and application deployment plan by analyzing the characteristics of each of the target applications in turn and assigning each application to a virtual image. The assignment of applications to virtual images take into account the application characteristics, such as the resources required by other applications assigned to the same virtual image, as well as application compatibility data. If the virtual machine deployment and application deployment planning module 516 determines that the virtual machine image resources would be exceeded by adding the application to the virtual image, a different virtual image is sought on which to place the application. If a suitable virtual image is found, the application is assigned to the found virtual image. If no suitable virtual image is found, a new virtual image is allocated, and the application is assigned to the new virtual image. In one example the resources allocated to a virtual image may be based on hardware preferences stored in the preference store 524. In another example, the resources allocated to a virtual image may be based on a default set of hardware characteristics.

At 616 the virtual image deployment and application deployment planning module 516 determines, based on the initial virtual machine deployment plan, a set of minimum hardware attributes 518 suitable for executing the target applications in a virtualized manner. The determination may be made, for instance, by determining the minimum requirements for processing power, storage, memory, network capabilities, etc. as determined from the application attributes.

In a further example the hardware attributes determined by the module 516 may define a set of commercially available hardware, for example from a hardware library or database (not shown), by selecting a set of physical hardware that collectively have hardware attributes that meet the determined minimum hardware requirements. The selection process may, in some examples, include pricing information and other technical and non-technical attributes.

Depending on the set of physical hardware determined at 616, and depending on the characteristics thereof, the module 618 may need to adjust the initial virtual machine and application deployment plan to produce a final virtual machine image and application deployment plan. For instance, if a cost limit is included in the hardware preference data the module 516 may determine that two smaller and cheaper servers are required, rather than one larger, more expensive server. In this case, one or more additional virtual machine image may be required and the application deployment plan would need adjusting to take into account the additional virtual machine image or images.

Using the obtained information the virtual machine deployment and application deployment planning module 516 determines (614) a final virtual image deployment plan 526 and a final application deployment or stacking plan 528. The virtual image deployment plan defines the type and number of virtual images that are determined to be suitable for hosting or executing the set of applications. The virtual image deployment plan 526 additionally defines the way in which the defined virtual images should be installed on the determined physical hardware. The application deployment or stacking plan 528 defines which of the target applications should be installed on which of the virtual images.

In some examples the virtual machine image deployment and application deployment planning module 516 calculates, for different combinations of target hardware and target applications, different virtual machine deployment plans 526 and application stacking plans 528 using appropriate ones of the application and virtual machine attributes.

In one example the module 516 determines multiple different combinations of virtual machines and application deployments and ranks the different combinations based on one or more different parameters. The module 516 may rank the different combinations based on different criteria, including, for example, the smallest number of virtual machine images, the smallest number of physical servers, the highest number of applications per virtual machine image, the lower hardware cost, etc. The module 516 may automatically select one of the deployment plans as being the preferred deployment plan based on some predetermined preferences, such as preferences stored in the preference data store 524.

In a further example a list of different deployment plans may be presented to a system administrator or architect for manual selection of a preferred deployment plan and preferred hardware attributes. The presentation may be made, for example, via a visual display unit (not shown) associated with the virtualization assessment engine 302.

The determined virtual machine and application deployment plans 526 and 528, as well as the determined hardware attributes 518, may be output in the form of appropriate metadata, for example in an XML format. The virtual machine and application deployment plans 526 and 528 may be used by virtualization management applications to automatically configure the target hardware with appropriate virtual machine images, and appropriately distribute the target applications in accordance with the selected virtual machine and application deployment plan. The determined hardware attributes 518 may be used by a procurement application for ordering the determined hardware.

Figure 7:
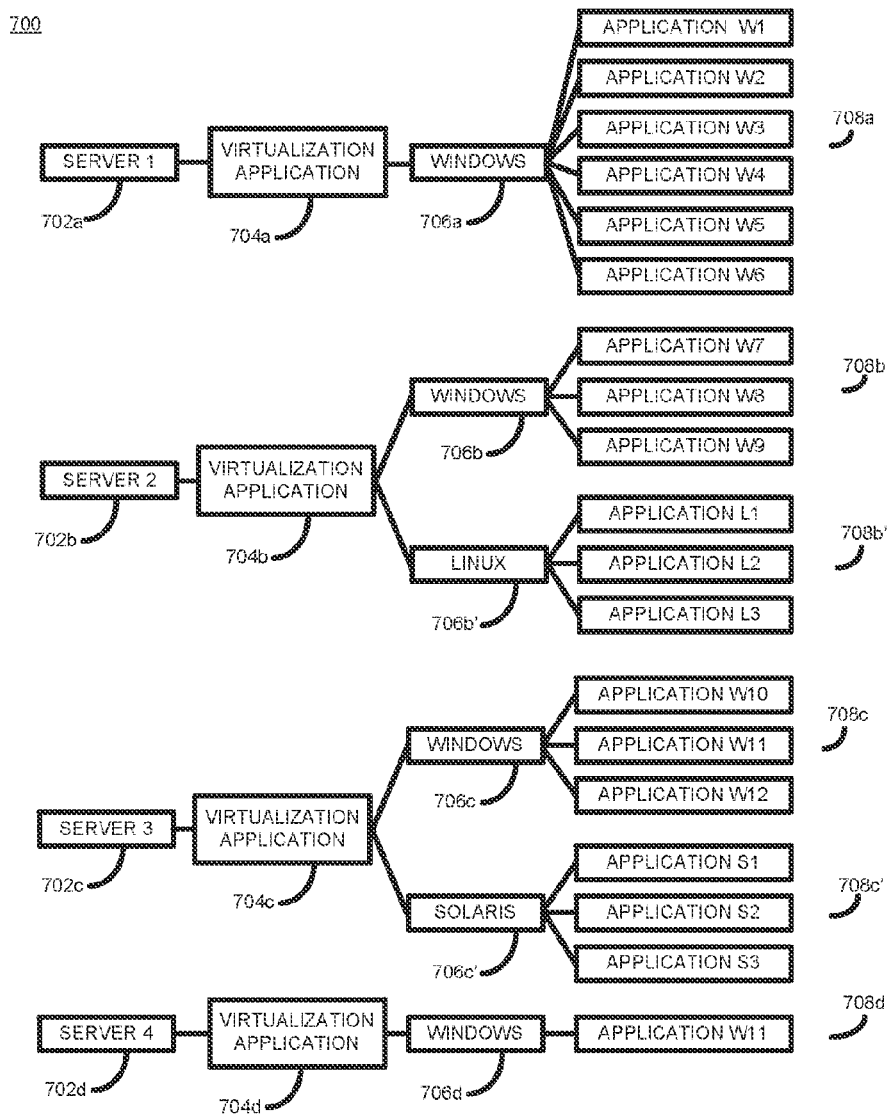
FIG. 7 is an illustration of a virtual image and application deployment plan according to one example.

An example illustration of a virtual image and application deployment plan 700 is shown in FIG. 7. A number of physical servers 702a to 702d are shown, each running a virtualization application 704a, 704b, 704c, 704d respectively. Server 702a runs a single Windows virtual image 706a on which run a number of Windows applications 708a. Server 702b runs a Windows virtual image 706b on which run Windows applications 708b, and a Linux virtual image 706b' on which run Linux applications 708b'. Server 702c runs a Windows virtual image 706c on which run Windows applications 708c, and a Solaris virtual image 706c' on which run Solaris applications 708c'. Finally, a server 702d runs a Windows virtual image 706d on which runs a single Windows application 708d.

In a yet further example the application model matcher module 502 is configured to create a new application model when it determined that the set of application attributes 504 for an application do not suitably match any application models currently stored in the application model store 510. In one example if a set of application attributes only partially match an existing application model, a new application model may be created by determining the closest matching application model and copying part of the determined closest matching application model and modifying it to create new model attributes for the non-matching elements. The newly generated application model may be stored in the application model store 510 for future use. In one example, an alert may be triggered when a new application model is created, for example to allow a system administrator or architect to update or verify the newly created application model and to add, if required, application model compatibility data to the application compatibility data store 514.

Figure 8:
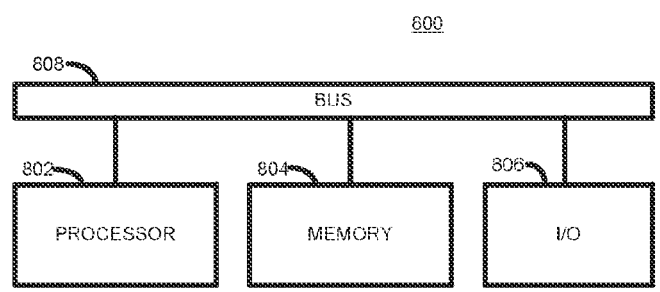
FIG. 8 is a simplified block diagram illustrating an implementation of a virtualization assessment engine according to one example of the present invention.

Referring now to FIG. 8 there is shown a block diagram 800 of an example implementation of the virtualization assessment engine 302. The virtualization assessment engine 302 comprises a microprocessor, control logic, or micro controller 802 for executing machine readable instructions stored in a memory 804. The machine readable or computer executable instructions may, when executed by the processor 802, perform method steps as described above as a computer implemented method. Input and output operations may be handled by an I/O module 806. The processor 802, memory 804, and I/O interface 806 are coupled or are in communication via a bus 808.

In a further example a carrier carrying computer-implementable instructions is provided that when interpreted by a computer, cause the computer to perform a method in accordance with any of the above-described examples.

It will be appreciated that examples can be realized in the form of hardware, software or a combination of hardware and software. Any such software may be stored in the form of tangible volatile or non-volatile storage such as, for example, a storage device like a ROM, whether erasable or rewritable or not, or in the form of memory such as, for example, RAM, memory chips device or integrated circuits or on an optically or magnetically readable medium such as, for example, a CD, DVD, magnetic disk or magnetic tape.

It will be appreciated that the storage devices and storage media are examples of machine-readable storage that are suitable for storing a program or programs that, when executed, implement embodiments of the present invention. Accordingly, examples may provide a program comprising code for implementing a system or method as described herein. Examples may additionally provide a machine readable storage storing such a program. Still further, examples may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of planning application deployment in a computer system, the method implemented with a processor coupled with a memory having executable instructions stored thereon, where the instructions, when executed by the processor, cause the processor to perform the method steps, comprising:
obtaining, for each of a plurality of computer applications, a set of application characteristics;
determining, based on the obtained characteristics, a match between each of the plurality of computer applications to an application model of a set of predetermined application models, wherein each of the predetermined application models includes computer application attributes;
assigning each of the plurality of computer applications to a matching application model of the predetermined application models;
determining compatibilities of the plurality of computer applications with each other based upon data pertaining to compatibilities of the predetermined application models, to which the plurality of computer applications are assigned, with respect to each other; and
determining, based in part on the obtained characteristics, and in part on the determined compatibilities of the plurality of applications with each other, a set of hardware characteristics, a virtual server distribution plan, and an application distribution plan.

2. The method of claim 1, wherein determining the set of hardware characteristics, the virtual server distribution plan, and the application distribution plan comprises:
determining an initial virtual server distribution plan;
determining the set of hardware characteristics;
revising the initial virtual server distribution plan in accordance with the determined set of hardware characteristics; and
determining the application distribution plan.

3. The method of claim 1, wherein the determined set of hardware characteristics define characteristics of a set of computing hardware suitable for executing the plurality of computer applications, wherein the determined virtual distribution plan defines a number and type of virtual servers to be deployed on the set of computing hardware, and wherein the application distribution plan defines which of the plurality of computer applications are to be deployed on which of the virtual servers.

4. The method of claim 1, wherein determining the virtual server distribution plan includes determining characteristics and number of virtual servers suitable for executing the plurality of computer applications on the determined computing hardware.

5. The method of claim 1, further comprising:
in response to a determination that a computer application does not suitably match any of the predetermined application models, generating a new application model based on characteristics of the computer application.

6. The method of claim 5, wherein generating a new application model comprises determining a closest matching application model and generating a new application model based on the determined closest matching application model.

7. The method of claim 1, wherein determining a virtual server deployment plan and an application distribution plan further comprises:
determining a plurality of different sets of hardware characteristics, virtual server deployment plans, and application distribution plans, wherein each of the plurality of different sets of hardware characteristics, virtual server deployment plans, and application distribution plans is determined based on different combinations of application characteristics and obtained preference data; and
selecting one of the plurality of determined sets of hardware characteristics, virtual server deployment plans, and application distribution plans based on the obtained preference data.

8. The method of claim 1, wherein determining compatibilities of the plurality of computer applications further comprises determining compatibilities of the plurality of computer applications to cohabit a virtual machine image or a physical hardware.

9. A system, comprising a processor, a memory in communication with the processor, and computer executable instructions stored in the memory and executable on the processor to:
obtain a set of characteristics for each of a plurality of applications;
match, using the obtained characteristics, each of the applications to an application model of a set of predetermined application models, wherein each of the predetermined application models includes application attributes;
determine, based upon data pertaining to compatibilities of the predetermined application models with respect to each other, compatibilities of the plurality of applications with each other;
generate, based at least upon the determined compatibilities of the applications with each other, an initial virtual server distribution plan;
generate a set of hardware characteristics; and
generate a revised virtual server distribution plan in accordance with the generated set of hardware characteristics.

10. The system of claim 9, wherein the computer executable instructions further include instructions to:
generate a list of computing hardware on which the applications are to be deployed.

11. The system of claim 9, wherein, to generate the revised server distribution plan, the computer executable instructions further include instructions to:
generate the virtual server distribution plan to include a detailing of the type and number of virtual servers suitable for executing the set of applications and on which ones of the determined computing hardware each virtual server is to be deployed.

12. The system of claim 11, wherein the computer executable instructions further include instructions to:
generate an application deployment plan detailing on which ones of the virtual servers each of the applications is to be deployed.

13. The system of claim 9, wherein the computer executable instructions further include instructions to:
determine that an application does not match any of the predetermined application models, generate a new application model based on characteristics of the application, and store the generated application model in an application model data store.

14. The system of claim 9, wherein the computer executable instructions to generate the revised virtual server distribution plan further include instructions to:
generate a plurality of sets of hardware characteristics, virtual server and application distribution plans; and
select one of the sets of hardware characteristics and associated generated virtual server distribution plans in accordance with obtained preference data.

15. The system of claim 9, wherein the computer executable instructions further comprise instructions to:
send the generated list of computing hardware to a procurement application for ordering the generated list of computing hardware.

16. The system of claim 9, wherein, to determine compatibilities of the plurality of applications, the computer executable instructions further include instructions to:
determine compatibilities of the plurality of applications to cohabit a virtual machine image or a physical hardware.

17. A non-transitory machine-readable medium that stores machine-readable instructions executable by a processor for planning application deployment in a computer system, the machine-readable medium comprising machine-readable instructions that, when executed by the processor, cause the processor to:
obtain, for each of a plurality of computer applications, a set of application characteristics;
determine, based on the obtained characteristics, a match between each of the plurality of computer applications to an application model of a set of predetermined application models, wherein each of the predetermined application models includes computer application attributes;
assign each of the plurality of computer applications to a matching application model of the predetermined application models;
determine, based upon data pertaining to compatibilities of the predetermined application models to which the plurality of computer applications are assigned, compatibilities of the plurality of computer applications with each other;
determine, based at least upon the determined compatibilities of the computer applications with each other, an initial virtual server distribution plan;
determine a set of hardware characteristics;

revise the initial virtual server distribution plan in accordance with the determined set of hardware characteristics; and determine an application distribution plan.

18. The non-transitory machine-readable medium of claim 17, wherein to determine compatibilities of the plurality of computer applications, the machine-readable instructions are further to cause the processor to:

determine compatibilities of the plurality of computer applications to cohabit a virtual machine image or a physical hardware.

* * * * *